(12) United States Patent
Yoo (10) Patent No.: US 11,502,714 B2
(45) Date of Patent: Nov. 15, 2022

(54) HIGH-SPEED DATA TRANSMITTING/RECEIVING SYSTEM AND METHOD OF REMOVING SIMULTANEOUS SWITCHING NOISE AND INTER-SYMBOL INTERFERENCE

(71) Applicant: INDUSTRY-UNIVERSITY COOPERATION FOUNDATION HANYANG UNIVERSITY, Seoul (KR)

(72) Inventor: Chang Sik Yoo, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 40 days.

(21) Appl. No.: 16/755,297

(22) PCT Filed: Oct. 27, 2017

(86) PCT No.: PCT/KR2017/011957
§ 371 (c)(1),
(2) Date: Apr. 10, 2020

(87) PCT Pub. No.: WO2019/074146
PCT Pub. Date: Apr. 18, 2019

(65) Prior Publication Data
US 2021/0028810 A1 Jan. 28, 2021

(30) Foreign Application Priority Data
Oct. 13, 2017 (KR) .................. 10-2017-0133139

(51) Int. Cl.
*H04B 1/40* (2015.01)
*H04L 1/00* (2006.01)

(52) U.S. Cl.
CPC .......... *H04B 1/40* (2013.01); *H04L 1/0009* (2013.01)

(58) Field of Classification Search
CPC ...................................................... H04B 1/40
See application file for complete search history.

(56) References Cited

U.S. PATENT DOCUMENTS

| 8,718,184 B1 | 5/2014 | Cronie et al. |
| 2007/0160155 A1 * | 7/2007 | Choi ............. H04L 25/085 |
| | | 375/257 |

(Continued)

FOREIGN PATENT DOCUMENTS

| CN | 101329742 B | * 11/2013 | ......... G06K 19/0701 |
| JP | 04360312 A | * 12/1992 | ............ G05F 1/462 |

(Continued)

OTHER PUBLICATIONS

International Search Report for PCT/KR2017/011957 dated Jul. 6, 2018 (PCT/ISA/210).

*Primary Examiner* — Hsinchun Liao
(74) *Attorney, Agent, or Firm* — Sughrue Mion, PLLC (57) ABSTRACT

Disclosed are high-speed data transmitting/receiving system and method capable of removing simultaneous switching noise and ISI at low cost and a small area. A transmitter used in the data transmitting/receiving system includes: a data mapping unit which maps 2-bit input data to one of codes, wherein the voltage level of a first signal line, the voltage level of a second signal line, and the voltage level of a third signal line are set in each of the codes; and a transmit driver which outputs data corresponding to the input data through the first signal line, the second signal line, and the third signal line having the voltage levels corresponding to the mapped code. Here, each of the voltage levels is '+1', '0' or '−1', and the number of signal lines having the voltage level (Continued)

of '+1' is the same as the number of signal lines having the voltage level of '−1'.

13 Claims, 7 Drawing Sheets

(56) References Cited

U.S. PATENT DOCUMENTS

2014/0254712 A1  9/2014  Lee et al.
2016/0013958 A1  1/2016  Mishra et al.

FOREIGN PATENT DOCUMENTS

| KR | 10-1265055 B1 | 5/2013 |
| KR | 10-2015-0126906 A | 11/2015 |
| KR | 10-2016-0105093 A | 9/2016 |
| KR | 10-2017-0035027 A | 3/2017 |

* cited by examiner

| Code No. | Data | Voltage level | | | Differential amplifier output | | | | | |
|---|---|---|---|---|---|---|---|---|---|---|
| | | A | B | C | $V_{OXP}$ | $V_{DXP}$ | $V_{OXP}$ | $V_{OXN}$ | $V_{OXN}$ | $V_{OXN}$ |
| 0 | 00 | 0 | 0 | 0 | $V_{DD}-V_{swing}/2$ | $V_{DD}-V_{swing}/2$ | $V_{DD}-V_{swing}/2$ | $V_{DD}-V_{swing}/2$ | $V_{DD}-V_{swing}/2$ | $V_{DD}-V_{swing}/2$ |
| 1 | 01 | 0 | +1 | −1 | $V_{DD}-V_{swing}/2$ | $V_{DD}-V_{swing}/2$ | $V_{DD}$ | $V_{DD}-V_{swing}$ | $V_{DD}-V_{swing}$ | $V_{DD}$ |
| 2 | 01 | 0 | −1 | +1 | $V_{DD}-V_{swing}/2$ | $V_{DD}-V_{swing}/2$ | $V_{DD}-V_{swing}$ | $V_{DD}$ | $V_{DD}$ | $V_{DD}-V_{swing}$ |
| 3 | 10 | +1 | 0 | −1 | $V_{DD}$ | $V_{DD}-V_{swing}$ | $V_{DD}-V_{swing}/2$ | $V_{DD}-V_{swing}/2$ | $V_{DD}-V_{swing}$ | $V_{DD}$ |
| 4 | 10 | −1 | 0 | +1 | $V_{DD}-V_{swing}$ | $V_{DD}$ | $V_{DD}-V_{swing}/2$ | $V_{DD}-V_{swing}/2$ | $V_{DD}$ | $V_{DD}-V_{swing}$ |
| 5 | 11 | +1 | −1 | 0 | $V_{DD}$ | $V_{DD}-V_{swing}$ | $V_{DD}$ | $V_{DD}-V_{swing}$ | $V_{DD}-V_{swing}/2$ | $V_{DD}-V_{swing}/2$ |
| 6 | 11 | −1 | +1 | 0 | $V_{DD}-V_{swing}$ | $V_{DD}$ | $V_{DD}-V_{swing}$ | $V_{DD}$ | $V_{DD}-V_{swing}/2$ | $V_{DD}-V_{swing}/2$ |

[FIG. 8]

Multi-input differential amplifier (MIDA)

OUTP−OUTN=(IN0+IN1+IN2)−(IN3+IN4+IN5)

[FIG. 9]

| Code No. | Data | Voltage level | | | MIDA output | | | | | |
|---|---|---|---|---|---|---|---|---|---|---|
| | | A | B | C | $V_{OXP}$ | $V_{OXN}$ | $V_{OXP}$ | $V_{OXN}$ | $V_{OXP}$ | $V_{OXN}$ |
| 0 | 00 | 0 | 0 | 0 | $V_{DD}$ | $V_{DD}-V_{swing}$ | $V_{DD}$ | $V_{DD}-V_{swing}$ | $V_{DD}$ | $V_{DD}-V_{swing}$ |
| 1 | 01 | 0 | +1 | −1 | $V_{DD}-V_{swing}$ | $V_{DD}$ | $V_{DD}$ | $V_{DD}-V_{swing}$ | $V_{DD}-V_{swing}$ | $V_{DD}$ |
| 2 | 01 | 0 | −1 | +1 | $V_{DD}$ | $V_{DD}-V_{swing}$ | $V_{DD}-V_{swing}$ | $V_{DD}$ | $V_{DD}$ | $V_{DD}-V_{swing}$ |
| 3 | 10 | +1 | 0 | −1 | $V_{DD}$ | $V_{DD}-V_{swing}$ | $V_{DD}$ | $V_{DD}-V_{swing}$ | $V_{DD}-V_{swing}$ | $V_{DD}$ |
| 4 | 10 | −1 | 0 | +1 | $V_{DD}-V_{swing}$ | $V_{DD}$ | $V_{DD}-V_{swing}$ | $V_{DD}$ | $V_{DD}$ | $V_{DD}-V_{swing}$ |
| 5 | 11 | +1 | −1 | 0 | $V_{DD}$ | $V_{DD}-V_{swing}$ | $V_{DD}-V_{swing}$ | $V_{DD}$ | $V_{DD}$ | $V_{DD}-V_{swing}$ |
| 6 | 11 | −1 | +1 | 0 | $V_{DD}-V_{swing}$ | $V_{DD}$ | $V_{DD}$ | $V_{DD}-V_{swing}$ | $V_{DD}$ | $V_{DD}-V_{swing}$ |

[FIG. 10]

| Code No. | Data | Voltage level | | | Sampler output | | | Decoder output |
|---|---|---|---|---|---|---|---|---|
| | | A | B | C | $D_A$ | $D_B$ | $D_C$ | |
| 0 | 00 | 0 | 0 | 0 | 1 | 1 | 1 | 00 |
| 1 | 01 | 0 | +1 | −1 | 0 | 1 | 0 | 01 |
| 2 | 01 | 0 | −1 | +1 | 1 | 0 | 1 | 01 |
| 3 | 10 | +1 | 0 | −1 | 1 | 1 | 0 | 10 |
| 4 | 10 | −1 | 0 | +1 | 0 | 0 | 1 | 10 |
| 5 | 11 | +1 | −1 | 0 | 1 | 0 | 0 | 11 |
| 6 | 11 | −1 | +1 | 0 | 0 | 1 | 1 | 11 |

HIGH-SPEED DATA TRANSMITTING/RECEIVING SYSTEM AND METHOD OF REMOVING SIMULTANEOUS SWITCHING NOISE AND INTER-SYMBOL INTERFERENCE

This application is a National Stage of International Application No. PCT/KR2017/011957 filed on Oct. 27, 2017, claiming priority based on Korean Patent Application No. 10-2017-0133139 filed Oct. 13, 2017, the entire disclosure of which is incorporated herein by reference.

TECHNICAL FIELD

The present invention relates to high-speed data transmitting/receiving system and method of removing simultaneous switching noise and inter-symbol interference (ISI).

BACKGROUND ART

A conventional transmitter uses a single-output transmitter. That is, in order to transmit data, one signal line per data bit has been used. In this case, an amount of current flowing through a power line and a ground line varied according to a pattern of input data, and as a result, simultaneous switching noise occurred.

In order to remove such simultaneous switching noise, a transmitter having a differential output structure was used. However, the differential output structure has large power consumption as compared to a single output structure and requires twice signal lines. As a result, there is problem that since the number of chip pins is increased, an area and cost are increased.

DISCLOSURE

Technical Problem

An object of the present invention is to provide high-speed data transmitting/receiving system and method capable of removing simultaneous switching noise and ISI at low cost and a small area.

Technical Solution

In order to achieve the object described above, according to an embodiment of the present invention, a transmitter used in a data transmitting/receiving system includes: a data mapping unit which maps 2-bit input data to one of codes, wherein a voltage level of a first signal line, a voltage level of a second signal line, and a voltage level of a third signal line are set in each of the codes; and a transmit driver which outputs data corresponding to the input data through the first signal line, the second signal line, and the third signal line having the voltage levels corresponding to the mapped code. Here, each of the voltage levels is '+1', '0', or '−1', and the number of signal lines having the voltage level of '+1' is the same as the number of signal lines having the voltage level of '−1'.

According to another embodiment of the present invention, a transmitter used in a data transmitting/receiving system includes: a data mapping unit which maps 2-bit input data to one of codes, wherein the voltage level of a first signal line, the voltage level of a second signal line, and the voltage level of a third signal line are set in each of the codes; and a transmit driver which outputs data corresponding to the input data through the first signal line, the second signal line, and the third signal line having the voltage levels corresponding to the mapped code. Here, each of the voltage levels is '+1', '0', or '−1', and even when the input data is changed, the voltage level of each of the signal lines is transited from '+1' to '−1' or not transited from '−1' to '+1'.

According to yet another embodiment of the present invention, a transmitter used in a data transmitting/receiving system includes: a data mapping unit which maps 2-bit input data to one of codes in which a voltage level of a first signal line, a voltage level of a second signal line, and a voltage level of a third signal line are set; and a transmit driver which outputs data corresponding to the input data through the first signal line, the second signal line, and the third signal line having the voltage levels corresponding to the mapped code. Here, when 2P bits are transmitted, P data mapping units and 3P transmit drivers are used, and even when the input data is changed, the voltage level of each of the signal lines is transited from '+1' to '−1' or not transited from '−1' to '+1', and the number of signal lines having the voltage level of '+1' is equal to the number of signal lines having the voltage level of '−1', wherein the P is a positive number of 1 or more.

According to an embodiment of the present invention, a receiver which receives data from a data mapping unit which maps 2-bit input data to one of codes in which a voltage level of a first signal line, a voltage level of a second signal line, and a voltage level of a third signal line are set and a transmitter which outputs the data corresponding to the input data through the first signal line, the second signal line, and the third signal line having the voltage levels corresponding to the mapped code, wherein even when the input data is changed, the voltage level of each of the signal lines is transited from '+1' to '−1' or not transited from '−1' to '+1', and the number of signal lines having the voltage level of '+1' is the same as the number of signal lines having the voltage level of '−1', the receiver includes: a first differential amplifier configured to receive a voltage of a first signal transmitted through the first signal line and an average voltage of the voltages of the signals; a second differential amplifier configured to receive a voltage of a second signal transmitted through the second signal line and an average voltage of the voltages of the signals; a third differential amplifier configured to receive a voltage of a third signal transmitted through the third signal line and an average voltage of the voltages of the signals; a first multi-input differential amplifier configured to receive outputs of the first differential amplifiers, outputs of the second differential amplifiers, and reference voltages; a second multi-input differential amplifier configured to receive outputs of the second differential amplifiers, outputs of the third differential amplifiers, and the reference voltages; a third multi-input differential amplifier configured to receive outputs of the third differential amplifiers, outputs of the first differential amplifiers, and the reference voltages; a first sampler configured to sample outputs of the first multi-input differential amplifier; a second sampler configured to sample outputs of the second multi-input differential amplifier; a third sampler configured to sample outputs of the third multi-input differential amplifier; and a decoder configured to decode outputs of the samplers to restore the input data. Here, the outputs of the differential amplifiers swing between $V_{DD}$ to ($V_{DD}-V_{SWING}$) and the outputs of the multi-input differential amplifiers have only $V_{DD}$ or ($V_{DD}-V_{SWING}$), and the $V_{DD}$ is a supply voltage supplied to the differential amplifiers.

According to another embodiment of the present invention, a receiver which receives data from a data mapping unit which maps 2-bit input data to one of codes in which a voltage level of a first signal line, a voltage level of a second signal line, and a voltage level of a third signal line are set and a transmitter which outputs the data corresponding to the input data through the first signal line, the second signal line, and the third signal line having the voltage levels corresponding to the mapped code, wherein even when the input data is changed, the voltage level of each of the signal lines is transited from '+1' to '−1' or not transited from '−1' to '+1', and the number of signal lines having the voltage level of '+1' is the same as the number of signal lines having the voltage level of '−1', the receiver includes: first comparators configured to compare a voltage of a first signal transmitted through the first signal line with reference voltages, respectively; second comparators configured to compare a voltage of a second signal transmitted through the second signal line with the reference voltages, respectively; third comparators configured to compare a voltage of a third signal transmitted through the third signal line with the reference voltages, respectively; and a decoder configured to decode outputs of the comparators to restore the input data, wherein each comparator outputs logic 1 when the voltage of the corresponding signal is greater than the corresponding reference voltage and outputs logic 0 when the voltage of the corresponding signal is smaller than the corresponding reference voltage. Here, among the reference voltages, a first reference voltage has an intermediate value between the voltage level corresponding to '+1' and the voltage level corresponding to '0', and a second reference voltage has an intermediate value between the voltage level corresponding to '0' and the voltage level corresponding to '−1'.

According to an embodiment of the present invention, a data transmitting method includes: mapping 2-bit input data to one of codes, wherein a voltage level of a first signal line, a voltage level of a second signal line, and a voltage level of a third signal line are set in each of the codes; and outputting the data corresponding to the input data through the first signal line, the second signal line, and the third signal line having the voltage levels corresponding to the mapped code. Here, each of the voltage levels is '+1', '0' or '−1', and the number of signal lines having a voltage level of '+1' is the same as the number of signal lines having a voltage level of '−1'.

According to the present invention, the high-speed data transmitting/receiving system and method may map 2-bit input data to one of codes in which a voltage level of a first signal line, a voltage level of a second signal line, and a voltage level of a third signal line are set and transmit the data corresponding to the input data through the first signal line, the second signal line, and the third signal line having the voltage levels corresponding to the mapped code. In this case, when a specific correlation is set between currents or voltages corresponding to '+1', '0', and '−1', the amount of the currents flowing through the power line and the ground line may be maintained constantly regardless of an input data pattern, and as a result, simultaneous switching noise may be removed.

Further, the high-speed data transmitting/receiving system and method may set the code so that the voltage level of the signal line having the voltage level of '+1' is not changed to the voltage level of '−1' when mapping the code and set the code so that the voltage level of the signal line having the voltage level of '−1' is not changed to the voltage level of '+1' to prevent ISI, and as a result, the reduction of the eye opening of the eye-diagram may be prevented.

MODES OF THE INVENTION

A singular form used in the present specification may include a plural form if there is no clearly opposite meaning in the context. In the present specification, a term such as "comprising" or "including" should not be interpreted as necessarily including all various components or various steps disclosed in the specification, and it should be interpreted that some component or some steps among them may not be included or additional components or steps may be further included. In addition, terms including "part", "module", and the like disclosed in the specification mean a unit that processes at least one function or operation and this may be implemented by hardware or software or a combination of hardware and software.

The present invention relates to high-speed data transmitting/receiving system and method (technology) including a single output transmitter capable of reducing simultaneous switching noise (power noise) at low cost and a small area. Specifically, the high-speed data transmitting/receiving technology of the present invention may reduce simultaneous switching noise by constantly maintaining an amount of currents flowing through a power line and a ground line regardless of an input data pattern.

In addition, the high-speed data transmitting/receiving technology of the present invention may prevent the reduction of eye opening in an eye-diagram by preventing inter-symbol interference (ISI) that may occur due to a difference in voltage level between signal lines.

According to an embodiment, the high-speed data transmitting/receiving technology of the present invention may map 2-bit input data into one of codes in which a voltage level of a first signal line, a voltage level of a second signal line, and a voltage level of a third signal line are set and transmit the data corresponding to the input data through the first signal line, the second signal line, and the third signal line having the voltage levels corresponding to the mapped code. At this time, the high-speed data transmitting/receiving technology makes the number of signal lines having the voltage level of '+1' equal to the number of signal lines having the voltage level of '−1' to remove the simultaneous switching noise. As a result, one signal line is increased, but a data transmission rate may be significantly increased.

In addition, the high-speed data transmitting/receiving technology removes inter-symbol interference (ISI) by reducing a voltage level change of the signal line, and as a result, reduction in the eye opening of the eye-diagram may be prevented.

The high-speed data transmitting/receiving technology of the present invention is applicable to all interfaces of transmitting the data, and for example, the high-speed data transmitting/receiving technology may be used in data transmission in an interface between a memory (e.g., a high bandwidth memory (HBM)) and a control chip for controlling the memory, an interface between displays, and the like.

Since the interface between the memory and the control chip in the related art has used a single ended structure, the simultaneous switching noise occurs and thus, the data transmission rate has no choice but to be lowered. Further, the interface between the displays has used a differential ended structure to remove the simultaneous switching noise, but there is a problem in that such a structure requires twice signal lines. As a result, the transmitter has no choice but to be implemented at high cost and a large area.

The high-speed data transmitting/receiving technology of the present invention may remove the simultaneous switching noise and the ISI while implementing the low cost and the small area.

Hereinafter, various embodiments of the present invention will be described in detail with reference to the accompanying drawings.

Figure 1:
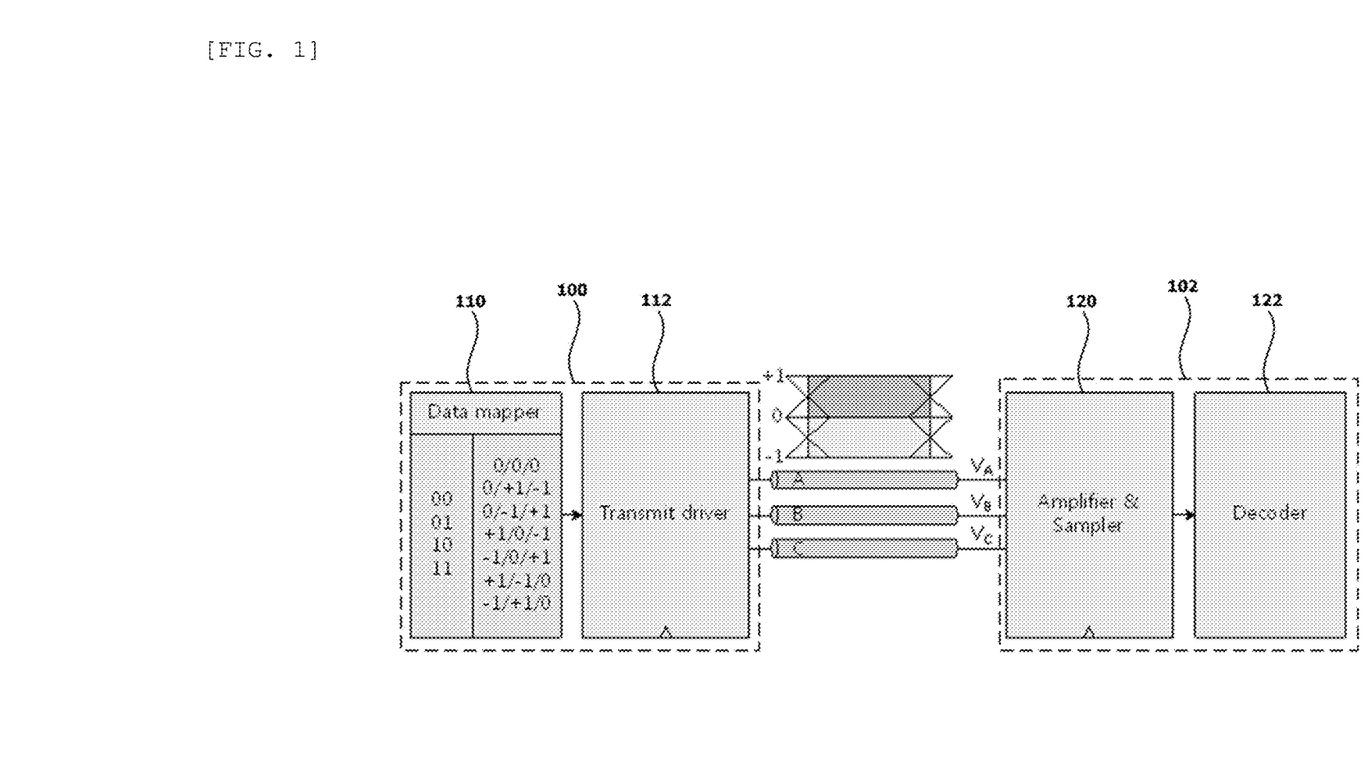
FIG. 1 is a diagram illustrating a high-speed data transmitting/receiving system according to an embodiment of the present invention.
Figure 2:
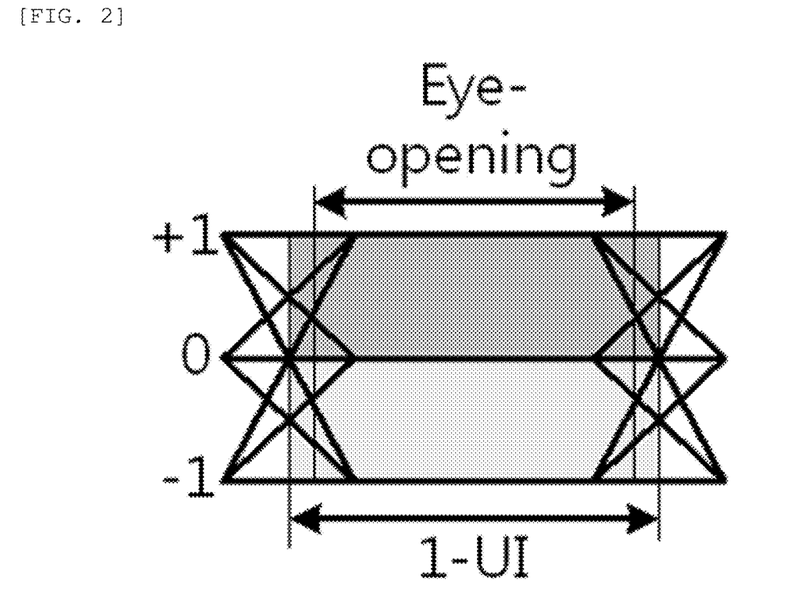
FIG. 2 is a diagram illustrating eye opening reduction by ISI which may be generated at three voltage levels.
Figure 3:
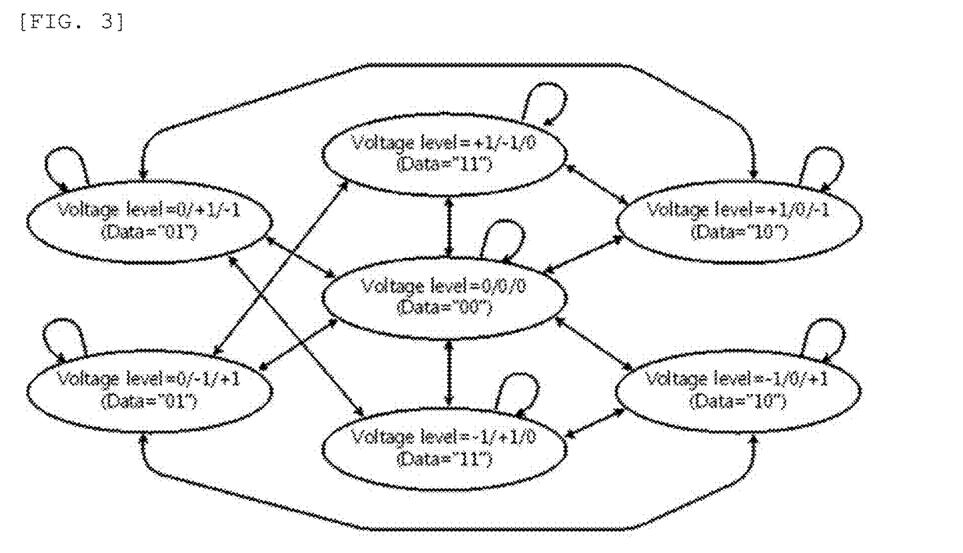
FIG. 3 is a diagram illustrating a transition diagram between codes according to an embodiment of the present invention.
Figure 4:
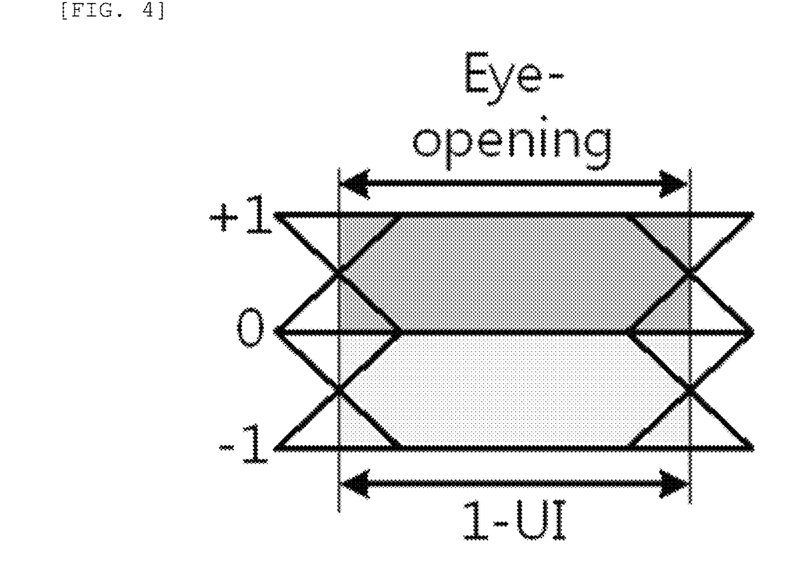
FIG. 4 is a diagram illustrating eye opening according to a code change control according to an embodiment of the present invention.
Figure 14:
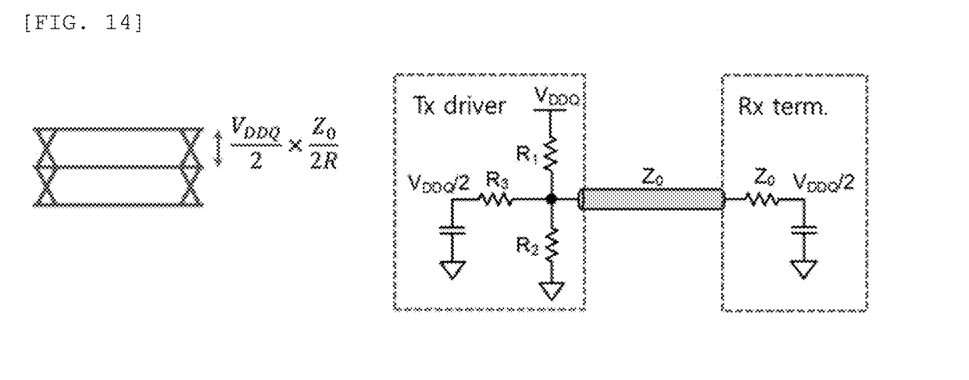
FIG. 14 is a circuit diagram illustrating a transmit driver according to an embodiment of the present invention.

FIG. 1 is a diagram illustrating a high-speed data transmitting/receiving system according to an embodiment of the present invention, FIG. 2 is a diagram illustrating eye opening reduction by ISI which may be generated at three voltage levels, and FIG. 3 is a diagram illustrating a transition diagram between codes according to an embodiment of the present invention. FIG. 4 is a diagram illustrating eye opening according to a code change control according to an embodiment of the present invention and FIG. 14 is a circuit diagram illustrating a transmit driver according to an embodiment of the present invention.

Referring to FIG. 1, the high-speed data transmitting/receiving system of the present embodiment includes a transmitter 100, signal lines A, B and C, and a receiver 102.

FIG. 1 illustrates a structure of a system for transmitting 2-bit input data. At this time, three signal lines A, B and C exist between the transmitter 100 and the receiver 102.

Such a data transmitting/receiving system is extended as the number of input bits increases. Specifically, the system of FIG. 1 increases by one whenever the input data increases by 2 bits. For example, when transmitting 4-bit input data, 6 signal lines are required, and when transmitting 8-bit input data, 12 signal lines are required.

The transmitter 100 includes a data mapping unit 110 and a transmit driver 112. Here, the number of transmit drivers 112 may be equal to the number of signal lines.

The receiver 102 may include an amplifier/sampler 120 and a decoder 122.

The data mapping unit 110 may map 2-bit input data to one of codes in which a voltage level of the first signal line A, a voltage level of the second signal line B, and a voltage level of the third signal line C are set.

The transmit driver 112 transmits data corresponding to the 2-bit input data to the amplifier/sampler 120 through the signal lines A, B, and C having the voltage levels corresponding to the mapped code. For example, the transmit driver 112 may transmit the data through a signal line A having a voltage level of '+1', a signal line B having a voltage level of '0', and a signal line C having a voltage level of '−1'.

The amplifier/sampler 120 amplifies and samples the signals transmitted through the signal lines A, B, and C.

The decoder 122 decodes data output from the amplifier/sampler 120 to restore the 2-bit input data.

Hereinafter, a high-speed data transmitting method in such a data transmitting/receiving system will be described.

First, voltage levels according to a code are set as shown in Table 1 below. Seven codes are assigned to the three signal lines A, B, and C.

TABLE 1

| | Voltage level | | |
|---|---|---|---|
| Code No. | Signal line (A) | Signal line (B) | Signal line (C) |
| 0 | 0 | 0 | 0 |
| 1 | 0 | +1 | −1 |
| 2 | 0 | −1 | +1 |
| 3 | +1 | 0 | −1 |
| 4 | −1 | 0 | +1 |
| 5 | +1 | −1 | 0 |
| 6 | −1 | +1 | 0 |

As can be seen from Table 1 above, in each code, the number of signal lines having the voltage level of '+1' is equal to the number of signal lines having the voltage level of '−1'. That is, the number of signal lines having the voltage level of '+1' and signal lines having the voltage level of '−1' among the three signal lines A, B, and C is 0 or 2.

Hereinafter, when the signal lines have the voltage level of '+1', the magnitudes of currents flowing through a power line VDD and a ground line VSS are represented by $I_{VDD+1}$ and $I_{VSS+1}$, respectively, when the signal lines have the voltage level of '0', the magnitudes of the currents flowing through the VDD and the VSS are represented by $I_{VDD0}$ and $I_{VSS0}$, respectively, and when the signal lines have the voltage level of '−1', the magnitudes of the currents flowing through the VDD and the VSS are represented by $I_{VDD-1}$ and $I_{VSS-1}$, respectively.

In this case, when a specific correlation is set between currents or voltages corresponding to '+1', '0', and '−1', the amount of the currents flowing through the power line and the ground line may be made to be constant regardless of the input data. As a result, the simultaneous switching noise may be reduced.

Specifically, when the three voltage levels are set to '+1', '0', and '−1', currents may be set as shown in Table 2 below. Here, a $V_{DD}$ current represents a current flowing through the power line and a $V_{SS}$ current represents a current flowing through the ground line.

TABLE 2

| Level | $V_{DD}$ current | $V_{SS}$ current |
|---|---|---|
| +1 | $I_{VDD+1}$ | $I_{VSS+1}$ |
| 0 | $I_{VDD0}$ | $I_{VSS0}$ |
| −1 | $I_{VDD-1}$ | $I_{VSS-1}$ |

In the case of the voltage level of '+1', $I_{VDD+1}$ may flow from a power supply voltage through the power line, and $I_{VSS+1}$ may flow to ground through the ground line, and in the case of the voltage level of '−1', $I_{VDD-1}$ may flow from the power supply voltage and $I_{VSS-1}$ may flow to the ground through the ground line, and in the case of the voltage level of '0', $I_{VDD0}$ may flow from the power supply voltage through the power line and $I_{VSS0}$ may flow to the ground through the ground line.

When the current flowing through the power line is calculated based on Table 2, the current is the same as Equation 1 below, and when the current flowing through the ground line is calculated, the current is the same as Equation 2 below. If the number of signal lines having the voltage level of '+1' is expressed as K, the number of signal lines having the voltage level of '−1' is also expressed as K. N represents the total number of signal lines. In the case of transmitting the 2-bit data, N is 3 and K has a value of 0 or 1 in the following Equations.

$$K^*(I_{VDD+1}+I_{VDD-1})+(N-2K)^*I_{VDD0} \quad \text{[Equation 1]}$$

$$K^*(I_{VSS+1}+I_{VSS-1})+(N-2K)^*I_{VSS0} \quad \text{[Equation 2]}$$

In Equation 1, if $I_{VDD0}=0.5^*(I_{VDD+1}+I_{VDD-1})$, the current flowing through the power line becomes $N^*I_{VDD0}$ regardless of the input data. That is, the current flowing through the power line is constant regardless of the input data and a current change rate becomes 0.

In addition, in Equation 2, if $I_{VSS0}=0.5^*(I_{VSS+1}+I_{VSS-1})$, the current flowing through the ground line becomes $N^*I_{VSS0}$ regardless of the input data. That is, the current flowing through the ground line is constant regardless of the input data and a current change rate becomes 0.

In general, inductance is formed in the power line and the ground line, and noise v of the power line and the ground line formed by the inductance is expressed by Equation 3 below.

$$v = L\frac{di}{dt} \quad \text{[Equation 3]}$$

In the related art using a single output transmitter, the current flowing through the power line or the ground line according to the input data varies depending on an input bit, and the magnitude of the current is changed with time. As a result, the simultaneous switching noise occurred.

However, in the high-speed data transmitting/receiving technology of the present invention, the currents flowing through the power line and the ground line are constant regardless of the input data. That is, a change amount of the current flowing through the power line or the ground line is 0. As a result, the simultaneous switching noise does not occur.

In summary, if a condition of $I_{VDD0}=0.5^*(I_{VDD+1}+I_{VDD-1})$ and a condition of $I_{VSS0}=0.5^*(I_{VSS+1}+I_{VSS-1})$ are set, the magnitudes of the currents flowing through the power line and ground line are always equal to each other with respect to the seven codes, and as a result, the simultaneous switching noise may be reduced.

However, since there are three voltage levels that each signal line may have, the change amount of the voltage level may vary. For example, when changed from Code No. 1 to Code No. 4, the voltage level of the third signal line C is transited from '−1' to '+1', and when changed from Code No. 1 to Code No. 0, the voltage level of the third signal line C is transited from '−1' to '0'. That is, depending on the situation, the change amount in the voltage level of the signal line may be different twice. The difference in the change amount of the voltage level generates ISI as illustrated in FIG. 2, and as a result, eye-opening is reduced in the eye-diagram of the signal. This acts as a limit to increase the transmission rate of the signal.

Therefore, the high-speed data transmitting/receiving technology of the present invention may control a code change in order to prevent the reduction of the eye opening by the ISI. Specifically, the high-speed data transmitting/receiving technology may control the code so that the voltage level of the signal lines having the voltage level of '+1' is not changed to the voltage level of '−1' during the code mapping and control the code so that the voltage level of the signal lines having the voltage level of '−1' is not changed to the voltage level of '+1'.

An example of such code control is shown in FIG. 3.

Referring to FIG. 3, the seven codes may be transited to four codes, including each code itself. Here, except for the input data '00', the remaining input data may be mapped to at least two codes. From the overall viewpoint, 2-bit input data may be mapped to at least one code.

Specifically, the input data '00' may be mapped to a code corresponding to voltage levels '0/0/0'. That is, the input data '00' is mapped to one code. Here, the voltage levels are voltage levels of the signal lines A, B, and C.

The input data '01' may be mapped to a code corresponding to voltage levels '0/+1/−1' or '0/−1/+1'. That is, the input data '01' may be mapped to two codes. The input data '10' may be mapped to a code corresponding to voltage levels '+1/0/−1' or '−1/0/+1'. That is, the input data '10' may be mapped to two codes.

The input data '11' may be mapped to a code corresponding to voltage levels '+1/−1/0' or '−1/+1/0'. That is, the input data '11' may be mapped to two codes.

When the code is mapped as such, a data transmitting process will be described. For example, when the data corresponding to the input data '10' is transmitted after the data corresponding to the input data '01' is transmitted through the signal lines A, B, and C having the voltage levels '0/+1/−1', the voltage levels '+1/0/−1' may be selected from the voltage levels '+1/0/−1' and '−1/0/+1' of the signal lines A, B, and C corresponding to the input data '10'.

That is, the input data '10' is converted into a code having the voltage levels '+1/0/−1' and the data corresponding to the code is transmitted through the signal lines A, B, and C. In this case, the voltage level of the signal line A is transited from '0' to '+1', the voltage level of the signal line B is transited from '+1' to '0', and the voltage level of the signal line C is maintained to '−1'. That is, there is no case where the voltage level of the signal line is transited from '+1' to '−1' or transited from '−1' to '+1'. Accordingly, the ISI may not occur.

On the other hand, when the voltage levels '−1/0/+1' is selected from the voltage levels '+1/0/−1' and '−1/0/+1' of the signal lines A, B, and C corresponding to the input data '10', the voltage level of the signal line A is transited from '0' to '−1', the voltage level of the signal line B is transited from '+1' to '0', and the voltage level of the signal line C is transited from '−1' to '+1'. That is, the voltage level of the signal line C is transited from '−1' to '+1', and as a result, the ISI occurs.

Meanwhile, hereinabove, it was described that a bit of '00' is mapped to one code and the remaining bits are mapped to a plurality of codes, but the other bit, for example, a bit of '10' is mapped to one code and the remaining bits may also be mapped to a plurality of codes.

Therefore, in the high-speed data transmitting/receiving technology of the present invention, two or more codes are allocated to the remaining input data except for one input data, but an appropriate code may be selected so that there is no case where the voltage level of the signal line is transited from '+1' to '−1' or transited from '−1' to '+1' during the data transmission.

That is, the data mapping unit 110 maps the 2-bit input data to a code having the voltage levels of the three signal lines A, B, and C, but maps one input data to a plurality of codes so that the voltage level of the signal line may be transited from '+1' to '−1' or may not be transited from '−1' to '+1'.

When describing the eye opening when using the high-speed data transmitting/receiving technology, the ISI may not occur, and as a result, as illustrated in FIG. 4, the eye opening may not be reduced.

In summary, in the high-speed data transmitting/receiving technology of the present embodiment, in order to transmit the 2-bit input data from the transmitter 100 to the receiver 102, the input data is mapped to at least one code, preferably, the remaining input data except for one input data are mapped to the plurality of codes, wherein the corresponding data is transmitted by selecting an appropriate code so that the voltage level of the corresponding signal line is transited from '+1' to '−1' or not transited from '−1' to '+1'. As a result, the ISI does not occur to prevent the reduction of the eye opening.

Hereinabove, the process of transmitting the 2-bit input data has been described, and when transmitting the input data of 4 bits, 6 bits, 8 bits, and the like, a plurality of systems for transmitting the 2-bit input data may be used. Specifically, when it is desired to transmit 2P bits, P data mapping units and 3P transmit drivers may be used, wherein P is an integer of 1 or more.

For example, when it is desired to transmit the input data of 8 bits, four systems (the system in FIG. 1) for transmitting 2-bit input data may be used. That is, four systems (including four data mapping units and 12 transmit drivers) for transmitting the 2-bit input data are present, wherein the systems may have the structure of FIG. 1, respectively. In this case, 12 signal lines are required, and thus, a signal line reduction effect of 25% may be obtained as compared to a conventional differential output system requiring 16 signal lines.

That is, the high-speed data transmitting/receiving system of the present invention may remove simultaneous switching noise while reducing the signal lines for data transmission and particularly, also prevent the ISI to significantly improve the data transmission rate.

Hereinafter, an example of the transmit driver 112 will be described. Here, the characteristic impedance of a transmission line is assumed to be Z0. The characteristic impedance of the transmission line and the output impedance of the transmit driver 112 are the same as each other, so that there is no reflection of the signal.

Referring to FIG. 14, the transmit driver 112 may include three resistors $R_1$, $R_2$, and $R_3$ connected with each other in parallel based on the corresponding signal line and a capacitor. Here, the capacitor is connected between the resistor $R_3$ and a ground and has a voltage of ($V_{DDQ}$)/2, wherein $V_{DDQ}$ is a power supply voltage.

The resistor $R_1$ is connected between the power supply voltage and a node corresponding to the signal line, the resistor $R_2$ is connected between the node and the ground, and the resistor $R_3$ is connected between the node and the capacitor. A relationship between the resistors $R_1$, $R_2$, and $R_3$ is shown in Table 3 below.

TABLE 3

| Level | $R_1$ | $R_2$ | $R_3$ |
|---|---|---|---|
| +1 | $R (> Z_0)$ | ∞ | $\dfrac{R \cdot Z_0}{R - Z_0}$ |
| 0 | $\dfrac{4R^2}{2R - Z_0}$ | $\dfrac{4R^2}{2R - Z_0}$ | $\dfrac{2Z_0 R^2}{2R^2 + Z_0^2 - 2RZ_0}$ |
| −1 | ∞ | R | $\dfrac{R \cdot Z_0}{R - Z_0}$ |

Referring to Table 3, when the voltage level of the signal line is '+1', the resistor $R_2$ is ∞, and thus, the resistance of the transmit driver 112 may be determined by the resistors $R_1$ and $R_3$, when the voltage level of the signal line is '−1', the resistor $R_1$ is ∞, and thus, the resistance of the transmit driver 112 may be determined by the resistors $R_2$ and $R_3$, and when the voltage level of the signal line is '0', the resistance of the transmit driver 112 may be determined by all the resistors $R_1$, $R_2$, and $R_3$. Here, when the voltage level of the signal line is '0', the resistors $R_1$ and $R_2$ may have the same resistance value $$\frac{4R^2}{2R - Z_0}.$$

However, the above structure is an example of the transmit driver 112, and can be variously modified.

Hereinafter, a circuit structure of the receiver 102 will be described with reference to the accompanying drawings.

Figure 5:
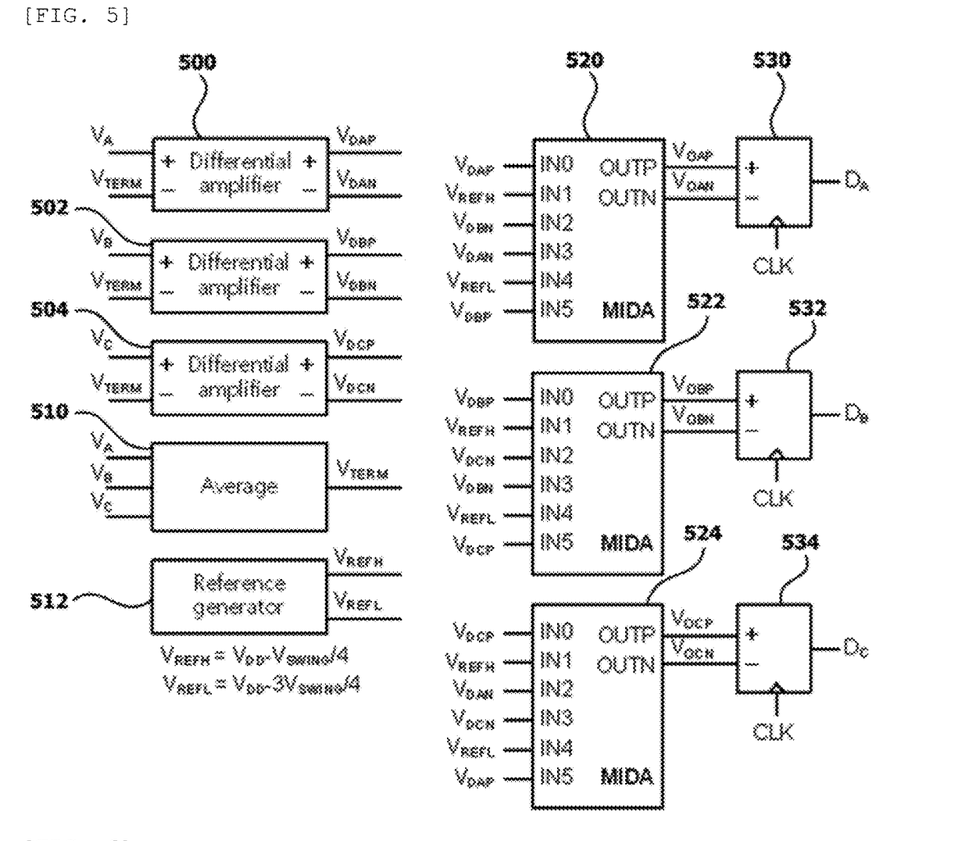
FIG. 5 is a circuit diagram illustrating an amplifier/sampler in a receiver according to an embodiment of the present invention.
Figure 6:
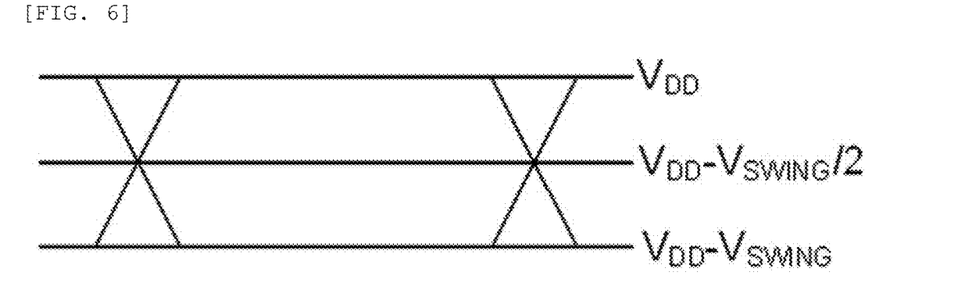
FIG. 6 is a diagram illustrating voltage swing levels according to an embodiment of the present invention.
Figure 7:
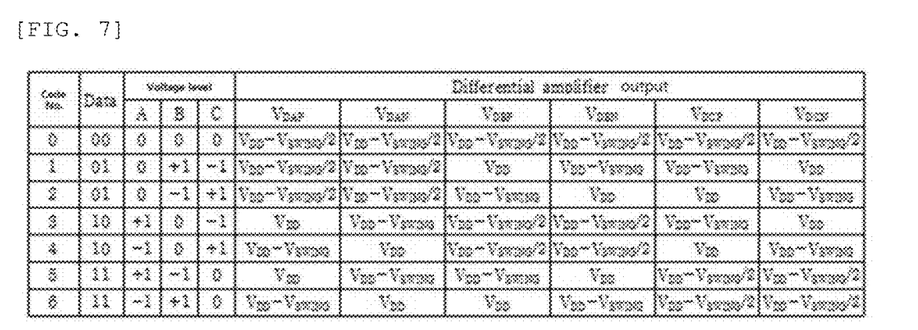
FIG. 7 is a diagram illustrating output voltage levels of a differential amplifier for codes according to an embodiment of the present invention.
Figure 8:
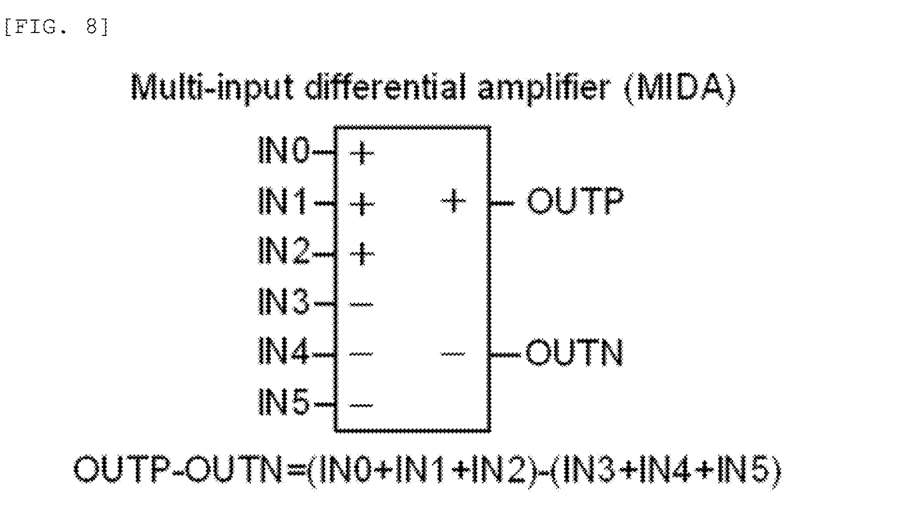
FIG. 8 is a diagram illustrating a concept of a multi-input differential amplifier (MIDA) according to an embodiment of the present invention.
Figure 9:
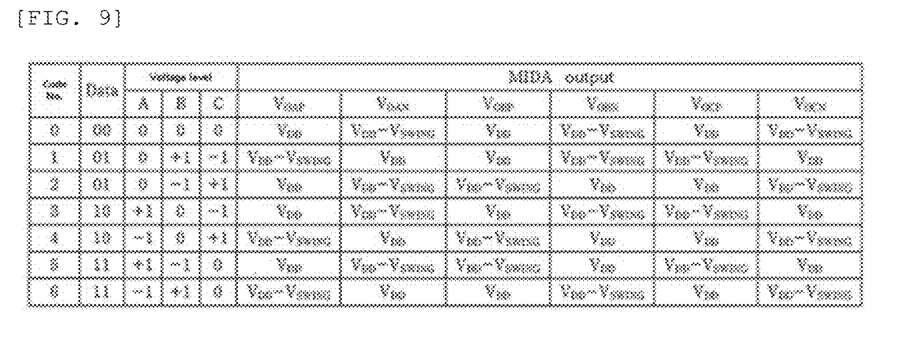
FIG. 9 is a diagram illustrating voltage levels of MIDA outputs according to an embodiment of the present invention.
Figure 10:
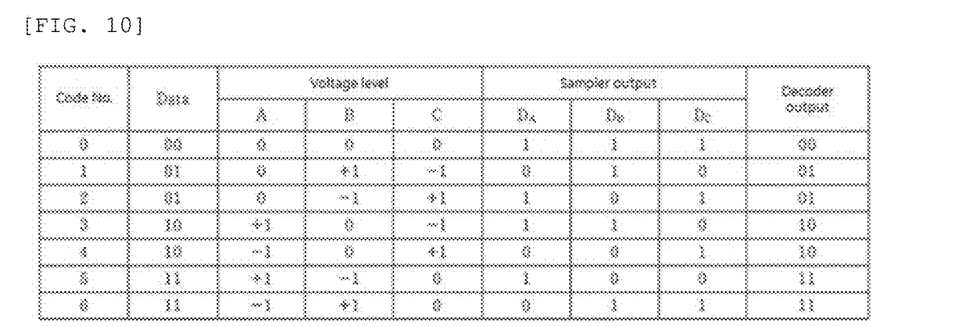
FIG. 10 is a diagram illustrating outputs of a sampler and outputs of a decoder for each code according to an embodiment of the present invention.

FIG. 5 is a circuit diagram illustrating an amplifier/sampler in a receiver according to an embodiment of the present invention, FIG. 6 is a diagram illustrating voltage swing levels according to an embodiment of the present invention, and FIG. 7 is a diagram illustrating output voltage levels of a differential amplifier for codes according to an embodiment of the present invention. FIG. 8 is a diagram illustrating a concept of a multi-input differential amplifier (MIDA) according to an embodiment of the present invention, FIG. 9 is a diagram illustrating voltage levels of MIDA outputs according to an embodiment of the present invention, and FIG. 10 is a diagram illustrating outputs of a sampler and outputs of a decoder for each code according to an embodiment of the present invention.

Referring to FIG. 5, the amplifier/sampler 120 of the present embodiment is a circuit corresponding to the 2-bit input data, and may include differential amplifiers 500, 502, and 504, an averager 510, a reference generator 512, three MIDAs 520, 522 and 524, and three samplers 530, 532 and 534.

The differential amplifier 500 outputs output voltages $V_{DAP}/V_{DAN}$ by inputting a voltage $V_A$ of a signal transmitted through the signal line A and an average voltage $V_{TERM}$ output from the averager 510. Here, the voltage $V_A$ is input to a positive terminal of the differential amplifier 500 and the average voltage $V_{TERM}$ is input to a negative terminal of the differential amplifier 500. Further, the average voltage $V_{TERM}$ represents an average of voltages $V_A$, $V_B$, and $V_C$ of the signals transmitted through the signal lines A, B, and C.

Hereinafter, it is assumed that output voltages $V_{DAP}/V_{DAN}$, $V_{DBP}/V_{DBN}$, and $V_{DCP}/V_{DCN}$ of the differential amplifiers 500, 502, and 504 swing between $V_{DD}$ to ($V_{DD}-V_{SWING}$) as illustrated in FIG. 6, respectively. Here, $V_{DD}$ corresponds to a supply voltage of the differential amplifiers 500, 502, and 504.

When the inputs $V_A$ and $V_{TERM}$ of the differential amplifier 500 have different values, the output voltages $V_{DAP}/V_{DAN}$ of the differential amplifier 500 have $V_{DD}$ or ($V_{DD}-V_{SWING}$), and when the inputs $V_A$ and $V_{TERM}$ have the same value, the output voltages $V_{DAP}/V_{DAN}$ of the differential amplifier 500 may have ($V_{DD}-V_{SWING}/2$) respectively. This is illustrated in detail in FIG. 7.

For example, when the voltage levels of the signal lines A, B, and C are '000', the inputs $V_A$ and $V_{TERM}$ may have the same value. Accordingly, the output voltages $V_{DAP}/V_{DAN}$ of the differential amplifier 500 may have ($V_{DD}-V_{SWING}/2$), respectively, as shown in FIG. 7.

As another example, when the voltage levels of the signal lines A, B, and C are '+10−1', the inputs $V_A$ and $V_{TERM}$ may have different values. Accordingly, the output voltages $V_{DAP}/V_{DAN}$ of the differential amplifier 500 corresponding to the signal line A having the voltage level '+1' may have $V_{DD}$ and ($V_{DD}-V_{SWING}$) respectively. That is, the output voltage $V_{DAP}$ may have $V_{DD}$ which is a relatively large value in response to the voltage level '+1'.

As yet another example, when the voltage levels of the signal lines A, B, and C are '−10+1', the inputs $V_A$ and $V_{TERM}$ may have different values. Accordingly, the output voltages $V_{DAP}/V_{DAN}$ of the differential amplifier 500 corresponding to the signal line A having the voltage level '−1' may have ($V_{DD}-V_{SWING}$) and $V_{DD}$, respectively. That is, the output voltage $V_{DAP}$ may have ($V_{DD}-V_{SWING}$) which is a relatively small value in response to the voltage level '−1'.

The differential amplifier 502 outputs output voltages $V_{DBP}/V_{DBN}$ by inputting a voltage $V_B$ of a signal transmitted through the signal line B and an average voltage $V_{TERM}$ output from the averager 510. Here, the voltage $V_B$ is input to a positive terminal of the differential amplifier 502 and the average voltage $V_{TERM}$ is input to a negative terminal of the differential amplifier 502.

When the inputs $V_B$ and $V_{TERM}$ of the differential amplifier 502 have different values, the output voltages $V_{DBP}/V_{DBN}$ of the differential amplifier 502 have $V_{DD}$ or ($V_{DD}-V_{SWING}$), and when the inputs $V_B$ and $V_{TERM}$ have the same value, the output voltages $V_{DBP}/V_{DBN}$ of the differential amplifier 502 may have ($V_{DD}-V_{SWING}/2$) respectively. This is illustrated in detail in FIG. 7.

The differential amplifier 504 outputs output voltages $V_{DCP}/V_{DCN}$ by inputting a voltage $V_C$ of a signal transmitted through the signal line C and an average voltage $V_{TERM}$ output from the averager 510. Here, the voltage $V_C$ is input to a positive terminal of the differential amplifier 504 and the average voltage $V_{TERM}$ is input to a negative terminal of the differential amplifier 504.

When the inputs $V_C$ and $V_{TERM}$ of the differential amplifier 504 have different values, the output voltages $V_{DCP}/V_{DCN}$ of the differential amplifier 504 have $V_{DD}$ or ($V_{DD}-V_{SWING}$), and when the inputs $V_C$ and $V_{TERM}$ have the same value, the output voltages $V_{DCP}/V_{DCN}$ of the differential amplifier 504 may have ($V_{DD}-V_{SWING}/2$) respectively. This is illustrated in detail in FIG. 7.

The MIDA 520 may include six input terminals IN0, IN1, IN2, IN3, IN4, and IN5, and two output terminals OUTP and OUTN. $V_{DAP}$, $V_{REFH}$, $V_{DBN}$, $V_{DAN}$, $V_{REFL}$, and $V_{DBP}$ are input to the input terminals IN0, IN1, IN2, IN3, IN4, and IN5, respectively. Here, $V_{REFH}$ and $V_{REFL}$ are reference voltages output from the reference generator 512, and may have values of ($V_{DD}-V_{SWING}/4$) and ($V_{DD}-3*V_{SWING}/4$) respectively. That is, the output voltages $V_{DAP}/V_{DAN}$ and $V_{DBP}/V_{DBN}$ and the reference voltages $V_{REFH}$ and $V_{REFL}$ of the differential amplifiers 500 and 502 are input to the input terminals IN0, IN1, IN2, IN3, IN4, and IN5.

Output voltages $V_{OAP}$ and $V_{OAN}$ of the MIDA 520 may have a relation of FIG. 8 and Equation 1 below.

$$OUTP-OUTN=(IN0+IN1+IN2)-(IN3+IN4+IN5)$$

$$V_{OAP}-V_{OAN}=(V_{DAP}-V_{DAN})+(V_{REFH}-V_{REFL})+(V_{DBN}-V_{DBP})$$

$$V_{OBP}-V_{OBN}=(V_{DBP}-V_{DBN})+(V_{REFH}-V_{REFL})+(V_{DCN}-V_{DCP})$$

$$V_{OCP}-V_{OCN}=(V_{DCP}-V_{DCN})+(V_{REFH}-V_{REFL})+(V_{DAN}-V_{DAP}) \quad \text{[Equation 4]}$$

When the output voltages $V_{OAP}$ and $V_{OAN}$ of the MIDA 520 are calculated based on Equation 4, the output voltages $V_{OAP}$ and $V_{OAN}$ may have $V_{DD}$ or ($V_{DD}-V_{SWING}$) as shown in FIG. 9. That is, the output voltages $V_{OAP}$ and $V_{OAN}$ may not have ($V_{DD}-V_{SWING}/2$).

The sampler 530 may sample the output voltages $V_{OAP}$ and $V_{OAN}$ of the MIDA 520 through a flip-flop, for example, a D flip-flop, to generate an output DA having a specific voltage level.

For example, the sampler 530 may generate the output DA having the voltage level '1' when the output voltages $V_{OAP}$ and $V_{OAN}$ of the MIDA 520 have $V_{DD}$ and ($V_{DD}-V_{SWING}$) respectively. When the output voltages $V_{OAP}$ and $V_{OAN}$ have ($V_{DD}-V_{SWING}$) and $V_{DD}$, respectively, the sampler 530 may generate an output DA having a voltage level '0'. This is shown in FIG. 10.

The MIDA 522 may include six input terminals IN0, IN1, IN2, IN3, IN4, and IN5, and two output terminals OUTP and OUTN. $V_{DBP}$, $V_{REFH}$, $V_{DCN}$, $V_{DBN}$, $V_{REFL}$, and $V_{DCP}$ are input to the input terminals IN0, IN1, IN2, IN3, IN4, and IN5, respectively. That is, the output voltages $V_{DBP}/V_{DBN}$ and $V_{DCP}/V_{DCN}$ and the reference voltages $V_{REFH}$ and $V_{REFL}$ of the differential amplifiers 502 and 504 are input to the input terminals IN0, IN1, IN2, IN3, IN4, and IN5.

When output voltages $V_{OBP}$ and $V_{OBN}$ of the MIDA 522 are calculated based on Equation 4, the output voltages $V_{OBP}$ and $V_{OBN}$ may have $V_{DD}$ or ($V_{DD}-V_{SWING}$) as shown in FIG. 9. That is, the output voltages $V_{OBP}$ and $V_{OBN}$ may not have ($V_{DD}-V_{SWING}/2$).

The sampler 532 may sample the output voltages $V_{OBP}$ and $V_{OBN}$ of the MIDA 522 through a flip-flop, for example, a D flip-flop, to generate an output DB having a specific voltage level.

For example, the sampler 532 may generate the output DB having the voltage level '1' when the output voltages $V_{OBP}$ and $V_{OBN}$ of the MIDA 522 have $V_{DD}$ and ($V_{DD}-V_{SWING}$) respectively. When the output voltages $V_{OBP}$ and $V_{OBN}$ have ($V_{DD}-V_{SWING}$) and $V_{DD}$, respectively, the sampler 532 may generate an output DB having a voltage level '0'. This is shown in FIG. 10.

The MIDA 524 may include six input terminals IN0, IN1, IN2, IN3, IN4, and IN5, and two output terminals OUTP and OUTN. $V_{DCP}$, $V_{REFH}$, $V_{DAN}$, $V_{DCN}$, $V_{REFL}$, and $V_{DAP}$ are input to the input terminals IN0, IN1, IN2, IN3, IN4, and IN5, respectively. That is, the output voltages $V_{DCP}/V_{DCN}$ and $V_{DAP}/V_{DAN}$ and the reference voltages $V_{REFH}$ and $V_{REFL}$ of the differential amplifiers 504 and 500 are input to the input terminals IN0, IN1, IN2, IN3, IN4, and IN5.

When output voltages $V_{OCP}$ and $V_{OCN}$ of the MIDA 524 are calculated based on Equation 4, the output voltages $V_{OCP}$ and $V_{OCN}$ may have $V_{DD}$ or ($V_{DD}$–$V_{SWING}$) as shown in FIG. 9. That is, the output voltages $V_{OCP}$ and $V_{OCN}$ may not have ($V_{DD}$–$V_{SWING}/2$).

The sampler 534 may sample the output voltages $V_{OCP}$ and $V_{OCN}$ of the MIDA 524 through a flip-flop, for example, a D flip-flop, to generate an output Dc having a specific voltage level.

For example, the sampler 534 may generate the output $D_C$ having the voltage level '1' when the output voltages $V_{OCP}$ and $V_{OCN}$ of the MIDA 524 have $V_{DD}$ and ($V_{DD}$–$V_{SWING}$) respectively. When the output voltages $V_{OCP}$ and $V_{OCN}$ have ($V_{DD}$–$V_{SWING}$) and $V_{DD}$, respectively, the sampler 534 may generate an output $D_C$ having a voltage level '0'. This is shown in FIG. 10.

If the outputs $D_A$, $D_B$, and $D_C$ of the samplers 530, 532, and 534 are arranged as above, the outputs $D_A$, $D_B$, and $D_C$ have different values as illustrated in FIG. 10.

The decoder 122 may decode the outputs $D_A$, $D_B$, and $D_C$ of the samplers 530, 532, and 534 according to a specific reference to restore the original input data.

Figure 11:
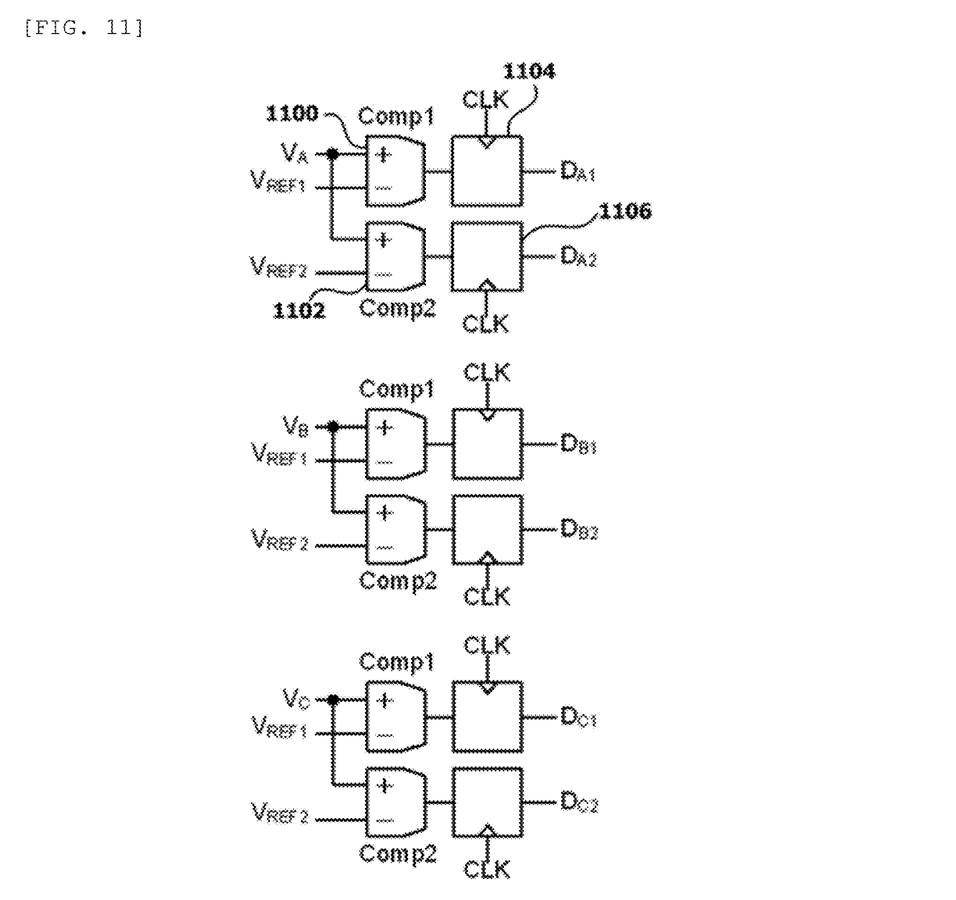
FIG. 11 is a diagram illustrating a structure of a receiver according to another embodiment of the present invention.
Figure 12:
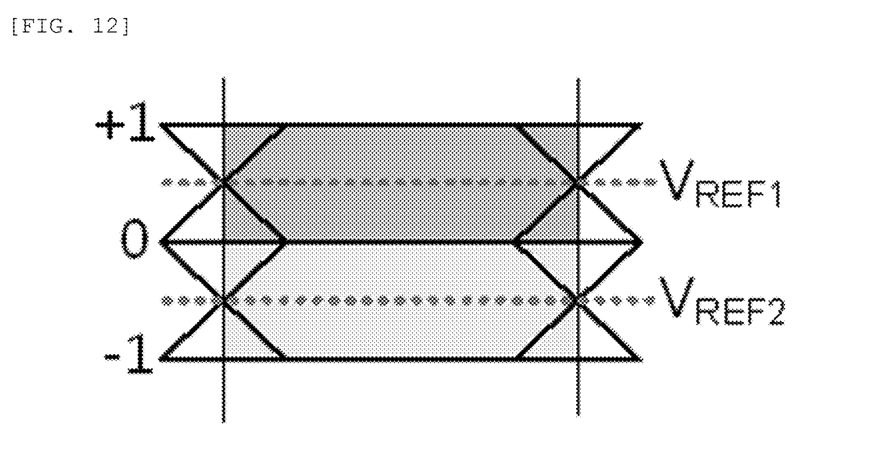
FIG. 12 is a diagram illustrating reference voltages of a comparator according to an embodiment of the present invention.
Figure 13:
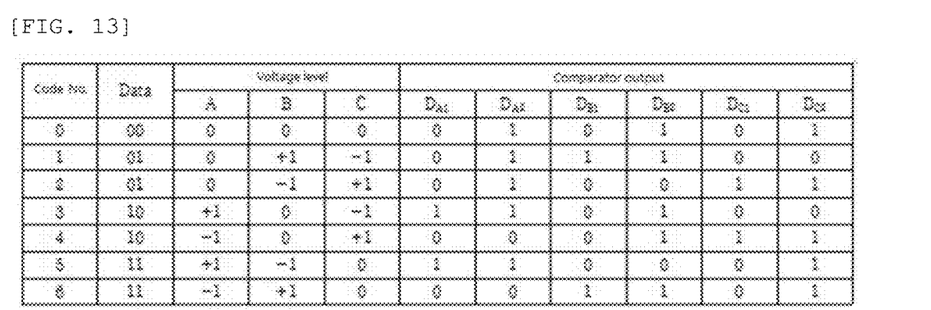
FIG. 13 is a diagram illustrating outputs of a comparator for each code according to an embodiment of the present invention.

FIG. 11 is a diagram illustrating a structure of a receiver according to another embodiment of the present invention, FIG. 12 is a diagram illustrating reference voltages of a comparator according to an embodiment of the present invention, and FIG. 13 is a diagram illustrating outputs of a comparator for each code according to an embodiment of the present invention.

Referring to FIG. 11, the receiver 102 of the present embodiment may include comparators and a decoder (not illustrated).

Specifically, there may be two comparators for each of the signal lines A, B, and C.

For example, the receiver 102 may include two comparators 1100/1104 and 1102/1106 with respect to the signal line A. A voltage $V_A$ and a first reference voltage $V_{REF1}$ of a signal transmitted through the signal line A are input to the comparator 1100/1104, and the voltage $V_A$ and a second reference voltage $V_{REF2}$ may be input to the comparator 1102/1106. Here, the first reference voltage $V_{REF1}$ has an intermediate value between the voltage level corresponding to '+1' and the voltage level corresponding to '0', and the second reference voltage $V_{REF2}$ may have an intermediate value between the voltage level corresponding to '0' and the voltage level corresponding to '−1'.

Therefore, when the voltage $V_A$ corresponding to a bit '0' is input, an output $D_{A1}$ of the comparator 1100/1104 may have '0' because the voltage $V_A$ is smaller than the first reference voltage $V_{REF1}$, and an output $D_{A2}$ may have '1' because the voltage $V_A$ is greater than the second reference voltage $V_{REF2}$.

When the voltage $V_A$ corresponding to a bit '+1' is input, the output $D_{A1}$ of the comparator 1100/1104 may have '1' because the voltage $V_A$ is greater than the first reference voltage $V_{REF1}$, and the output $D_{A2}$ may have '1' because the voltage $V_A$ is greater than the second reference voltage $V_{REF2}$.

When the voltage $V_A$ corresponding to a bit '−1' is input, the output $D_{A1}$ of the comparator 1100/1104 may have '0' because the voltage $V_A$ is smaller than the first reference voltage $V_{REF1}$, and the output $D_{A2}$ may have '0' because the voltage $V_A$ is smaller than the second reference voltage $V_{REF2}$.

The receiver 102 may further include two comparators for the signal line B and two comparators for the signal line C.

Here, except that a voltage $V_B$ of a signal transmitted through the signal line B is input to two comparators for the signal line B and a voltage $V_C$ of a signal transmitted through the signal line C is input to two comparators for the signal line C instead of the voltage $V_A$, an operation of the comparators is the same as the operation of the comparators 1100/1104 and 1102/1106 corresponding to the signal line A, and thus, the description thereof will be omitted.

The decoder decodes outputs $D_{A1}$, $D_{A2}$, $D_{B1}$, $D_{B2}$, $D_{C1}$, and $D_{C2}$ of the comparators to restore the input data.

For example, the decoder may restore the input data to '1' when the outputs $D_{A1}/D_{A2}$, $D_{B1}/D_{B2}$ or $D_{C1}/D_{C2}$ have '01', restore the input data to '+1' when the outputs $D_{A1}/D_{A2}$, $D_{B1}/D_{B2}$ or $D_{C1}/D_{C2}$ have '11', and restore the input data to '−1' when the outputs $D_{A1}/D_{A2}$, $D_{B1}/D_{B2}$ or $D_{C1}/D_{C2}$ have '00'.

Meanwhile, components of the aforementioned embodiment may be easily determined in terms of a process. That is, each component may be determined by each process. Further, processes of the aforementioned embodiment may be easily determined in terms of a component of a device.

The technical contents described above are implemented in the form of a program command which may be performed by various computer means and may be recorded in a computer readable medium. The computer readable medium may include a program command, a data file, and a data structure alone or in combination. The program command recorded in the medium may be specially designed and configured for the embodiments or may be publicly known to and used by those skilled in the computer software field. An example of the computer readable medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. Examples of the program command include a high-level language code executable by a computer by using an interpreter and the like, as well as a machine language code created by a compiler. The hardware devices may be configured to operate as one or more software modules in order to perform the operations of the embodiments, and vice versa.

INDUSTRIAL APPLICABILITY

The scope of the present invention is represented by claims to be described below, and it is to be interpreted that the meaning and the scope of the appended claims and all changes or modifications derived from equivalences thereof are included within the scope of the present invention.

The invention claimed is:

1. A transmitter used in a data transmitting/receiving system comprising:
   a data mapping unit configured to map 2-bit input data to one of codes, wherein a first voltage level of a first signal line, a second voltage level of a second signal line, and a third voltage level of a third signal line are set in each of the codes; and
   a transmit driver configured to output signals corresponding to the input data through the first signal line, the second signal line, and the third signal line which respectively have the first voltage level, the second voltage level, and the third voltage level corresponding to the mapped code, wherein each of the first voltage level, the second voltage level, and the third voltage level is '+1', '0' or '−1', a number of signal line having a voltage level of '+1' is the same as a number of signal line having a voltage level of '−1', wherein $I_{VDD0}=0.5*(I_{VDD+1}+I_{VDD-1})$ so that the current flowing through a power line is constant regardless of the input data, and wherein $I_{VDD+1}$ is the current flowing through the power line per voltage level of '+1', $I_{VDD0}$ is the current flowing through the power line per voltage level of '0', and $I_{VDD-1}$ is the current flowing through the power line per voltage level of '−1'.

2. The transmitter used in the data transmitting/receiving system of claim 1, wherein even when the input data is changed, none of the first voltage level, the second voltage level, and the third voltage level is transitioned from '+1' to '−1' or from '−1' to '+1', and each of the first voltage level, the second voltage level, and the third voltage level is transitioned from '+1' to '0', from '−1' to '0', from '0' to '+1', or from '0' to '−1'.

3. The transmitter used in the data transmitting/receiving system of claim 1, wherein remaining input data except for one input data are mapped to a plurality of different codes and the one input data is mapped to one code, such that none of the first voltage level, the second voltage level, and the third voltage level is transitioned from '+1' to '−1' or from '−1' to '+1'.

4. The transmitter used in the data transmitting/receiving system of claim 1, wherein for transmitting 2P bits, P data mapping units corresponding to 2-bit input data are used, 3P transmit drivers are used, and 3P signal lines are used between the transmitter and the receiver, wherein the P is a positive number of 1 or more.

5. The transmitter used in the data transmitting/receiving system of claim 1, wherein the transmit driver includes a first resistor, a second resistor, and a third resistor connected to a node corresponding to the first signal line in parallel, and a capacitor connected between the third resistor and a ground, the first resistor is connected between a power supply voltage and the node, the second resistor is connected between the node and the ground, and the third resistor is connected between the node and the capacitor, wherein when the first voltage level is '0', the first resistor and the second resistor have the same value.

6. A transmitter used in a data transmitting/receiving system comprising:

a data mapping unit configured to map 2-bit input data to one of codes, wherein a first voltage level of a first signal line, a second voltage level of a second signal line, and a third voltage level of a third signal line are set in each of the codes; and a transmit driver configured to output signals corresponding to the input data through the first signal line, the second signal line, and the third signal line which respectively have the first voltage level, the second voltage level and the third voltage level corresponding to the mapped code, wherein each of the first voltage level, the second voltage level, and the third voltage level is '+1', '0' or '−1', a number of signal line having a voltage level of '+1' is the same as a number of signal line having a voltage level of '−1', wherein $I_{VSS0}=0.5*(I_{VSS+1}+I_{VSS-1})$ so that the current flowing through a ground line is constant regardless of the input data, and wherein $I_{VSS-1}$ is the current flowing through the ground line per voltage level of '−1', $I_{VSS+1}$ is the current flowing through the ground line per voltage level of '+1', and $I_{VSS0}$ is the current flowing through the ground line per voltage level of '0'.

7. A receiver which receives signals from a transmitter which maps 2-bit input data to one of codes in which a first voltage level of a first signal line, a second voltage level of a second signal line, and a third voltage level of a third signal line are set, and outputs the signals corresponding to the input data through the first signal line, the second signal line, and the third signal line which respectively have the first voltage level, the second voltage level, and the third voltage level corresponding to the mapped code, wherein even when the input data is changed, none of the first voltage level, the second voltage level, and the third voltage level is transitioned from '+1' to '−1' or from '−1' to '+1', and a number of signal line having a voltage level of '+1' is the same as a number of signal line having the voltage level of '−1', the receiver comprising:

a first differential amplifier configured to receive a voltage of a first signal transmitted through the first signal line and an average voltage of voltages of the signals;

a second differential amplifier configured to receive a voltage of a second signal transmitted through the second signal line and the average voltage of the voltages of the signals;

a third differential amplifier configured to receive a voltage of a third signal transmitted through the third signal line and the average voltage of the voltages of the signals;

a first multi-input differential amplifier configured to receive outputs of the first differential amplifiers, outputs of the second differential amplifiers, and reference voltages;

a second multi-input differential amplifier configured to receive outputs of the second differential amplifiers, outputs of the third differential amplifiers, and the reference voltages;

a third multi-input differential amplifier configured to receive outputs of the third differential amplifiers, outputs of the first differential amplifiers, and the reference voltages;

a first sampler configured to sample outputs of the first multi-input differential amplifier;

a second sampler configured to sample outputs of the second multi-input differential amplifier;

a third sampler configured to sample outputs of the third multi-input differential amplifier; and a decoder configured to decode outputs of the first sample, the second sampler, and the third sampler to restore the input data, wherein the outputs of the differential amplifiers swing between $V_{DD}$ and $(V_{DD}-V_{SWING})$ and the outputs of the multi-input differential amplifiers have only $V_{DD}$ or $(V_{DD}-V_{SWING})$, and the $V_{DD}$ is a supply voltage supplied to the differential amplifiers.

8. The receiver of claim 7, wherein output voltages of the respective differential amplifiers have $V_{DD}$ or $(V_{DD}-$ $V_{SWING}$) when input voltages have different values, and have ($V_{DD}-V_{SWING}/2$) when the input voltages are the same value, respectively, and each of the first sample, the second sampler, and the third sampler generates an output having the voltage level of '1' when the outputs of the corresponding multi-input differential amplifiers have $V_{DD}$ and ($V_{DD}-V_{SWING}$), respectively, and generates an output having the voltage level of '0' when the outputs have ($V_{DD}-V_{SWING}$) and $V_{DD}$, respectively.

9. A receiver which receives signals from a transmitter which maps 2-bit input data to one of codes in which a first voltage level of a first signal line, a second voltage level of a second signal line, and a third voltage level of a third signal line are set, and outputs the signals corresponding to the input data through the first signal line, the second signal line, and the third signal line which respectively have the first voltage level, the second voltage level, and the third voltage level corresponding to the mapped code, wherein even when the input data is changed, none of the first voltage level, the second voltage level, and the third voltage level is transitioned from '+1' to '−1' or from '−1' to '+1', and a number of signal line having a voltage level of '+1' is the same as a number of signal line having a voltage level of '−1', the receiver comprising:

first comparators configured to compare a voltage of a first signal transmitted through the first signal line with reference voltages, respectively;

second comparators configured to compare a voltage of a second signal transmitted through the second signal line with the reference voltages, respectively;

third comparators configured to compare a voltage of a third signal transmitted through the third signal line with the reference voltages, respectively; and a decoder configured to decode outputs of the comparators to restore the input data, wherein each comparator outputs logic 1 when the voltage of the corresponding signal is greater than the corresponding reference voltage and outputs logic 0 when the voltage of the corresponding signal is smaller than the corresponding reference voltage, among the reference voltages, a first reference voltage has an intermediate value between the voltage level corresponding to '+1' and the voltage level corresponding to '0', and a second reference voltage has an intermediate value between the voltage level corresponding to '0' and the voltage level corresponding to '−1'.

10. The receiver of claim 9, wherein the decoder restores the input data to '1' when outputs of the comparators are '01', restores the input data to '+1' when the outputs of the comparators are '11', and restores the input data to '−1' when the outputs of the comparators are '00'.

11. A data transmitting method used in a data transmitting/receiving system comprising:

mapping 2-bit input data to one of codes, wherein a first voltage level of a first signal line, a second voltage level of a second signal line, and a third voltage level of a third signal line are set in each of the codes; and outputting signals corresponding to the input data through the first signal line, the second signal line, and the third signal line, which respectively have the first voltage level, the second voltage level, and the third voltage level corresponding to the mapped code, wherein each of the first voltage level, the second voltage level, and the third voltage level is '+1', '0' or '−1', a number of signal line having a voltage level of '+1' is the same as a number of signal line having a voltage level of '−1', wherein $I_{VDD0}=0.5*(I_{VDD+1}+I_{VDD-1})$ so that the current flowing through a power line is constant regardless of the input data, or $I_{VSS0}=0.5*(I_{VSS+1}+I_{VSS-1})$ so that the current flowing through a ground line is constant regardless of the input data, and wherein $I_{VDD+1}$ is the current flowing through the power line per voltage level of '+1' $I_{VDD-1}$ is the current flowing through the power line per voltage level of '−1', $I_{VDD0}$ is the current flowing through the power line per voltage level of '0', $I_{VSS-1}$ is the current flowing through the ground line per voltage level of '−1', $I_{VSS+1}$ is the current flowing through the ground line per voltage level of '+1', and $I_{VSS0}$ is the current flowing through the ground line per voltage level of '0'.

12. The data transmitting method of claim 11, wherein even when the input data is changed, none of the first voltage level, the second voltage level, and the third voltage level is transitioned from '+1' to '−1' or from '−1' to '+1', and each of the first voltage level, the second voltage level, and the third voltage level is transitioned to the same voltage level, transitioned from '+1' to '0', transitioned from '−1' to '0', transitioned from '0' to '+1', or transitioned from '0' to '−1'.

13. The data transmitting method of claim 11, wherein remaining input data except for one input data are mapped to a plurality of different codes and the one input data is mapped to one code, such that none of the first voltage level, the second voltage level, and the third voltage level is transitioned from '+1' to '−1' or from '−1' to '+1'.

* * * * *